(12) United States Patent
He et al.

(10) Patent No.: US 12,533,601 B2
(45) Date of Patent: Jan. 27, 2026

(54) ELECTROWETTING EFFECT-BASED SOLAR-DRIVEN HIGH EFFICIENCY HUMIDIFIER SYSTEM AND WORKING METHOD

(71) Applicant: NANJING UNIVERSITY OF AERONAUTICS AND ASTRONAUTICS, Nanjing (CN)

(72) Inventors: Weifeng He, Nanjing (CN); Yanfei Gao, Nanjing (CN); Dong Han, Nanjing (CN); Wenhao Pu, Nanjing (CN); Zhaohui Yao, Nanjing (CN); Qile Shi, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 228 days.

(21) Appl. No.: 18/575,818

(22) PCT Filed: Dec. 19, 2022

(86) PCT No.: PCT/CN2022/140004
§ 371 (c)(1),
(2) Date: Dec. 30, 2023

(87) PCT Pub. No.: WO2023/160161
PCT Pub. Date: Aug. 31, 2023

(65) Prior Publication Data
US 2024/0246008 A1    Jul. 25, 2024

(30) Foreign Application Priority Data
Feb. 28, 2022   (CN) .......................... 202210187698.7

(51) Int. Cl.
*B01B 1/00* (2006.01)
*F28D 5/02* (2006.01)
*H02S 40/44* (2014.01)

(52) U.S. Cl.
CPC ................. *B01B 1/005* (2013.01); *F28D 5/02* (2013.01); *H02S 40/44* (2014.12)

(58) Field of Classification Search
CPC ............ B01L 2400/0427; B01L 3/502; B01L 3/502784; B01L 3/502792; B01B 1/005; B01D 5/006; H02S 40/44; F28D 5/02
See application file for complete search history.

(56) References Cited

U.S. PATENT DOCUMENTS
2014/0090562 A1   4/2014   Choi et al.

FOREIGN PATENT DOCUMENTS
CN       104169656 A       11/2014
CN       104331092 A        2/2015
(Continued)

*Primary Examiner* — Gurpreet Kaur
(74) *Attorney, Agent, or Firm* — Treasure IP Group, LLC

(57) ABSTRACT

An electrowetting effect-based solar-driven high efficiency humidification system and a working method. A photovoltaic power generation module and an electrowetting high efficiency humidification module are combined, which conform to a solar energy transfer principle in a PV/T device, while liquid droplets are also sprayed at regular intervals on an upper surface of a heat exchange flow channel in the PV/T device, the principles of acceleration of liquid droplet internal flow and a change to surface hydrophilicity/hydrophobicity by electrowetting technology are used, liquid drop evaporation is accelerated, and highly efficient humidification of air is achieved. By means of coupled utilization of electrowetting technology and a PV/T system, water is saved while a large amount of moist air and clean electric energy which can be used for actual production are obtained.

2 Claims, 3 Drawing Sheets

(56) References Cited

FOREIGN PATENT DOCUMENTS

| | | |
|---|---|---|
| CN | 105135568 A | 12/2015 |
| CN | 207936383 U | 10/2018 |
| CN | 113944017 A | 1/2022 |
| CN | 114623532 A | 6/2022 |
| DE | 19646263 A | 5/1998 |

ELECTROWETTING EFFECT-BASED SOLAR-DRIVEN HIGH EFFICIENCY HUMIDIFIER SYSTEM AND WORKING METHOD

CROSS-REFERENCE TO RELATED APPLICATION

The present is national stage application of PCT application PCT/CN2022/140004, filed Dec. 19, 2022, entitled "ELECTROWETTING EFFECT-BASED SOLAR-DRIVEN HIGH EFFICIENCY HUMIDIFIER SYSTEM AND WORKING METHOD", which further takes claims priority from a Chinese Patent Application No. 202210187698.7, filed on Feb. 28, 2022, the entire contents of both applications are incorporated herein by reference in their entireties.

TECHNICAL FIELD

The present disclosure relates to an electrowetting effect-based solar-powered high efficiency humidifier system and a working method, belonging to the fields of energy and power engineering and high-efficiency humidification.

BACKGROUND ART

In conventional liquid water humidification systems, external heat sources are required to drive the systems. However, this humidification process not only consumes a large amount of heat energy but also results in heat dissipation, and such heat cannot be recovered. As a result, the energy utilization efficiency and economic viability of conventional humidification systems are reduced, and the use of external heat sources may also lead to serious environmental problems. Therefore, based on conventional humidification systems, the present disclosure proposes that an advanced electrowetting technology is adopted to maximize the utilization of waste heat from photovoltaic/thermal (PV/T) heat exchange channels without the need for additional energy input. This significantly improves the humidification efficiency and economic viability of the system, making it highly valuable for practical applications.

SUMMARY OF THE INVENTION

An objective of the present disclosure is to propose an electrowetting effect-based solar-powered high efficiency humidifier system and a working method.

Specifically, the objective of the present disclosure is implemented through the following technical solutions:

First, this application provides an electrowetting effect-based solar-powered high efficiency humidifier system, including a water pump, a flow control valve, a PV/T device (a photovoltaic/thermal system), a gas-liquid separator, a humid air tank, a water tank, and a blower, where the PV/T device successively includes a compound parabolic condenser (CPC), a photovoltaic panel and various cover plates, and a heat exchange channel from top to bottom; the heat exchange channel is surrounded by an insulation layer; the heat exchange channel consists of an upper plate, a lower plate, and a side plate; a water flow pipeline is embedded in the lower plate, and an upper surface of the lower plate is provided with a droplet nozzle in communication with the water flow pipeline; a lower surface of the upper plate is provided with an electrode array plate; a surface of the electrode array plate is coated with a dielectric waterproof layer; the electrode array plate consists of spaced positive and negative microelectrode plates arranged in an equidistant and dense manner; the electrode array plate is powered by electric energy generated by the PV/T device; and an outlet of the water pump is connected to an inlet of the flow control valve, and an outlet of the flow control valve is connected to a water flow pipeline inlet of the heat exchange channel of the PV/T device; an outlet of the heat exchange channel of the PV/T device is connected to an inlet of the gas-liquid separator, and a humid air outlet of the gas-liquid separator is connected to the humid air tank; a bottom water outlet of the gas-liquid separator is connected to an inlet of the water tank, and an outlet of the water tank is connected to an inlet of the water pump; and an inlet of the blower is connected to the outside, and an outlet thereof is connected to the heat exchange channel of the PV/T device.

Second, this application provides a working method of the electrowetting effect-based solar-powered high efficiency humidifier system, including the following processes: the water pump extracts water from the water tank, the water flows through the flow control valve, and the flow control valve intermittently supplies the water to the heat exchange channel of the PV/T device; furthermore, the blower supplies dry air to the PV/T device; when flowing through the PV/T device, the liquid water is heated by the heat exchange channel and rapidly evaporated, and the gas-liquid mixture is entrained in the dry air and flows through the gas-liquid separator; and separated humid air is stored in the humid air tank, and separated water flows into the water tank for further use. Specific working processes of the PV/T device are as follows: part of solar energy is converted into electrical energy by the photovoltaic panel and various cover plates, part of solar energy is converted into heat, and the heat is transferred to the heat exchange channel; the water flow intermittently passes through the water flow pipeline of the heat exchange channel; due to pressure, the water flow is ejected from the small droplet nozzle on the upper surface of the lower plate, forming small droplets attached to the lower surface of the upper plate of the heat exchange channel; the surface of the electrode array plate is coated with the dielectric waterproof layer for waterproof treatment; in this case, the droplets are distributed in the positive and negative microelectrode plates; under the action of the electric field, the internal flow of the droplets accelerates rapidly, and the droplets evaporate in a very short time; water vapor and a small number of tiny droplets suspended in the air are entrained and carried away by the passing dry air; furthermore, temperature of the heat exchange channel decreases, and power generation efficiency increases, obtaining more electrical energy; within a certain time interval, the droplets are completely evaporated, and then the intermittent flow control valve is opened to provide a new round of droplets, repeating the cycle; and in addition, the photovoltaic panel of the system generates electrical energy during the day, acting as a power source needed for a humidification process of the system.

The intermittent water supply of the droplet nozzle on the heat exchange channel can be implemented through a computer program. At a certain time interval, when the previous round of droplet evaporation is complete, new droplets are ejected. This system maximizes utilization efficiency and water-saving efficiency. The arrangement of the electrode plates can be determined based on actual conditions, including the spacing and area.

Compared to the related technology, the electrowetting effect-based solar-powered high efficiency humidifier system provided in this embodiment of this application has the following advantages: the introduction of the electrowetting technology into the PV/T system utilizes the heat absorption and power generation characteristics of the PV/T system. The droplets on the electrode plates are driven by the electric energy generated by power generation, greatly accelerating the internal flow and evaporation rate of the droplets, significantly improving the energy utilization efficiency of the humidifier system, and reducing the geographical limitations caused by external heat sources. In addition, the system provided in this embodiment eliminates the reliance of conventional humidification systems on fossil energy sources, reduces environmental pollution, and furthermore generates a large amount of usable humid air during power generation, achieving dual benefits.

BRIEF DESCRIPTION OF THE DRAWINGS

To describe the technical solutions in implementations of the present disclosure or the related art more clearly, the following briefly describes the accompanying drawings required for describing the implementations or the related art. Apparently, the accompanying drawings in the following description show merely some implementations of the present disclosure. For those of ordinary skill in the art, other drawings can be obtained according to these accompanying drawings without creative efforts.

Figure 1:
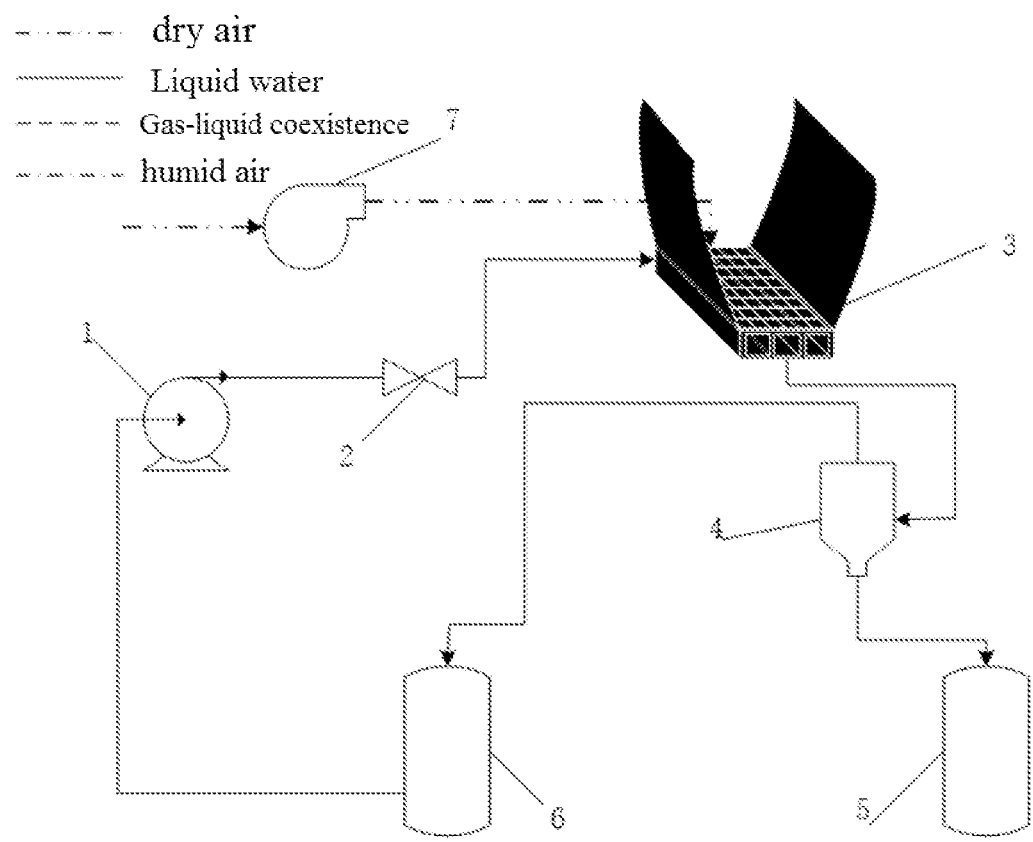
FIG. 1 is a schematic diagram showing the working principle of a solar-powered high efficiency humidifier system.
Figure 2:
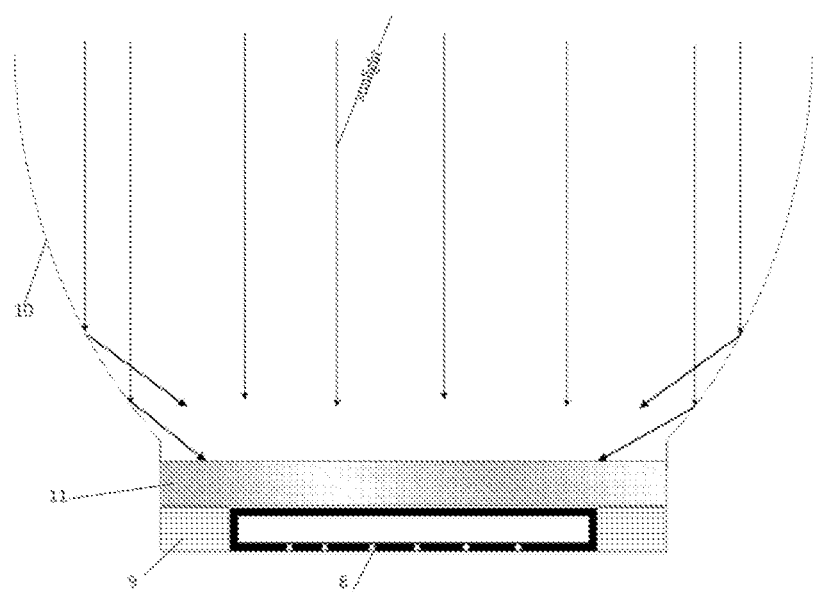
FIG. 2 is a schematic structural diagram of a PV/T device.
Figure 3:
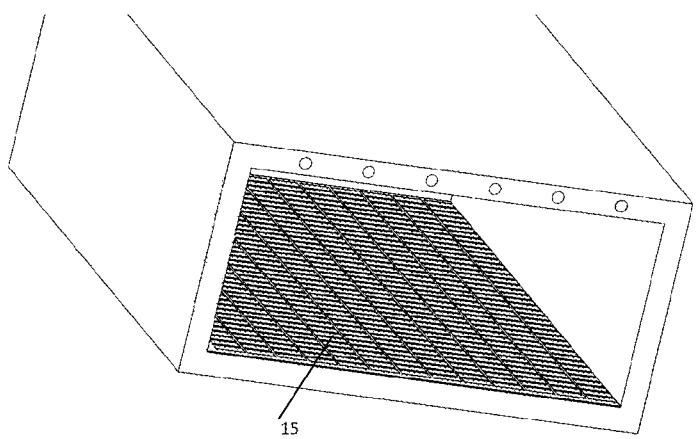
FIG. 3 is a schematic structural diagram of an upper plate of a heat exchange channel.
Figure 4:
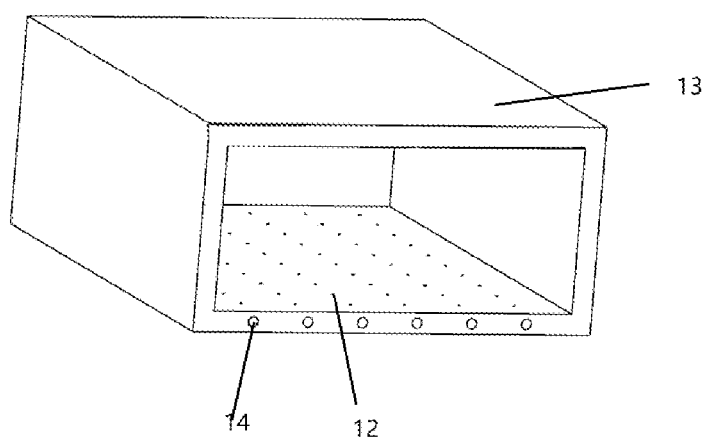
FIG. 4 is a schematic structural diagram of a lower plate of the heat exchange channel.
Figure 5:
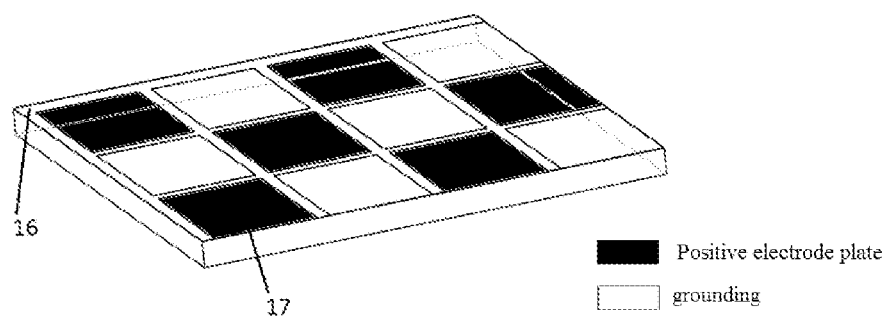
FIG. 5 is a partial enlarged view of the upper plate of the heat exchange channel.

Descriptions of reference numerals: 1, water pump; 2, flow control valve; 3, PV/T device; 4, gas-liquid separator; 5, humid air tank; 6, water tank; 7, blower; 8, heat exchange channel; 9, insulation layer; 10, CPC; 11, photovoltaic panel and various cover plates; 12, small droplet nozzle; 13, upper plate of heat exchange channel; 14, water flow pipeline; 15, electrode array plate; 16, dielectric waterproof layer; and 17, positive and negative microelectrode plate.

DETAILED DESCRIPTION OF THE INVENTION

The following embodiments are provided to further understand the present disclosure, the present disclosure is not limited to the preferred embodiments, and the following embodiments do not restrict the scope and content of the present disclosure. Any products that are the same or similar to the present disclosure, obtained by combining the features of the present disclosure with other related art, fall within the scope of protection of the present disclosure.

As shown in FIG. 1, this embodiment relates to an electrowetting effect-based solar-powered high efficiency humidifier system. An outlet of a water pump 1 is connected to an inlet of a flow control valve 2, and an outlet of the flow control valve 2 is connected to a water flow pipeline inlet of a heat exchange channel of a PV/T device 3. An outlet of the heat exchange channel of the PV/T device 3 is connected to an inlet of a gas-liquid separator 4, and a humid air outlet of the gas-liquid separator 4 is connected to a humid air tank 5. A bottom water outlet of the gas-liquid separator 4 is connected to an inlet of a water tank 6, and the water tank 6 is connected to the water pump 1. An inlet 7 of a blower is connected to the outside, and an outlet thereof is connected to the heat exchange channel of the PV/T device 3.

The water pump 1 extracts water from the water tank 6, the water flows through the flow control valve 2, and the flow control valve 2 intermittently supplies the water to the heat exchange channel of the PV/T device 3. Furthermore, the blower 7 supplies dry air to the PV/T device 3. When flowing through the PV/T device 3, the liquid water is heated by the heat exchange channel and rapidly evaporated, and the gas-liquid mixture is entrained in the dry air and flows through the gas-liquid separator 4. Separated humid air is stored in the humid air tank 5, and separated water flows into the water tank 6 for further use.

In FIG. 2 to FIG. 5, the PV/T device 3 successively includes a CPC 10, a photovoltaic panel and various cover plates 11, and a heat exchange channel 8 from top to bottom. The heat exchange channel 8 is surrounded by an insulation layer 9. The heat exchange channel consists of an upper plate, a lower plate, and a side plate. A water flow pipeline 14 is embedded in the lower plate, and an upper surface of the lower plate is provided with a small droplet nozzle 12 in communication with the water flow pipeline. A lower surface of the upper plate 13 is provided with an electrode array plate 15. A surface of the electrode array plate 15 is coated with a dielectric waterproof layer 16. The electrode array plate 15 consists of spaced positive and negative microelectrode plates 17 arranged in an equidistant and dense manner.

Specific working process of the PV/T device is as follows: part of solar energy is converted into electrical energy by the PV panel and various cover plates 11, part of solar energy is converted into heat, and the heat is transferred to the heat exchange channel 8. The water flow intermittently passes through the water flow pipeline 14 of the heat exchange channel. Due to pressure, the water flow is ejected from the small droplet nozzle 12 on the upper surface of the lower plate, forming small droplets attached to the lower surface of the upper plate of the heat exchange channel. The surface of electrode array plate is coated with the dielectric waterproof layer 16 for waterproof treatment. In this case, the droplets are distributed in the positive and negative microelectrode plates 17; under the action of the electric field, the internal flow of the droplets accelerates rapidly, and the droplets evaporate in a very short time. Water vapor and a small number of tiny droplets suspended in the air are carried away by the passing dry air. Furthermore, temperature of the heat exchange channel 8 decreases, and power generation efficiency increases, obtaining more electrical energy. Within a certain time interval, the droplets are completely evaporated, and then the intermittent flow control valve 2 is opened to provide a new round of droplets, repeating the cycle.

The invention claimed is:

1. An electrowetting effect-based solar-powered high efficiency humidifier system, comprising:
a water pump (1), a flow control valve (2), a photovoltaic/thermal (PV/T) device (3), a gas- liquid separator (4), a humid air tank (5), a water tank (6), and a blower (7), wherein the PV/T device (3) successively comprises a compound parabolic condenser (CPC) (10), a photovoltaic panel and various cover plates (11), and a heat exchange channel (8) from top to bottom; the heat exchange channel (8) is surrounded by an insulation layer (9);
the heat exchange channel consists of an upper plate, a lower plate, and a side plate; a water flow pipeline (14) is embedded in the lower plate, and an upper surface of the lower plate is provided with a droplet nozzle (12) in communication with the water flow pipeline;

a lower surface of the upper plate is provided with an electrode array plate (15); a surface of the electrode array plate (15) is coated with a dielectric waterproof layer (16); the electrode array plate (15) consists of spaced positive and negative microelectrode plates (17) arranged in an equidistant and dense manner; the electrode array plate (15) is powered by electric energy generated by the PV/T device (3); and an outlet of the water pump (1) is connected to an inlet of the flow control valve (2), and an outlet of the flow control valve (2) is connected to a water flow pipeline inlet of the heat exchange channel of the PV/T device (3); an outlet of the heat exchange channel of the PV/T device (3) is connected to an inlet of the gas-liquid separator (4), and a humid air outlet of the gas-liquid separator (4) is connected to the humid air tank (5); a bottom water outlet of the gas-liquid separator (4) is connected to an inlet of the water tank (6), and an outlet of the water tank (6) is connected to an inlet of the water pump (1); and an inlet (7) of the blower is connected to the outside, and an outlet thereof is connected to the heat exchange channel of the PV/T device (3).

2. A operation method of a high efficiency humidifier, comprising:

providing an electrowetting effect-based solar-powered humidifier system of claim 1;

extracting water from the water tank (6) using the water pump (1);

flowing the water through the flow control valve (2), wherein the flow control valve (2) intermittently supplies water to the heat exchange channel of the PV/T device (3);

supplying dry air to the PV/T device (3) via the blower (7);

heating the water in the heat exchange channel of the PV/T device (3), thereby rapidly evaporating the water;

entraining a gas-liquid mixture in the dry air, and flowing the mixture through the gas-liquid separator (4);

storing separated humid air in the humid air tank (5); and flowing separated water into the water tank (6) for reuse;

wherein an operation process of the PV/T device of the electrowetting effect- based solar-powered humidifier, comprising:

converting part of solar energy into electrical energy via the photovoltaic panel and various cover plates (11) in the PV/T device (3);

converting another part of the solar energy into heat, and transferring the heat to the heat exchange channel (8);

intermittently passing the water flow through the water flow pipeline (14) of the heat exchange channel;

ejecting the water flow from the small droplet nozzle (12) on the upper surface of the lower plate, forming small droplets attached to the lower surface of the upper plate of the heat exchange channel;

coating the surface of the electrode array plate with the dielectric waterproof layer (16) for waterproof treatment;

distributing the small droplets in the positive and negative microelectrode plates (17);

accelerating the internal flow of the small droplets rapidly under the action of the electric field, resulting in the small droplets evaporating in a very short time;

entraining and carrying away water vapor and a small number of tiny small droplets suspended in the air by the passing dry air;

decreasing the temperature of the heat exchange channel (8), thereby increasing power generation efficiency and obtaining more electrical energy;

completely evaporating the small droplets within a certain time interval, followed by the opening of the intermittent flow control valve (2) to provide a new round of droplets, repeating the cycle;

generating electrical energy during the day via the photovoltaic panel of the system, acting as a power source needed for the humidification process of the system.

* * * * *